United States Patent [19]

Bollinger et al.

[11] Patent Number: 4,597,934

[45] Date of Patent: Jul. 1, 1986

[54] MULTI-FUNCTION MAGNETIC JACK CONTROL DRIVE MECHANISM

[75] Inventors: Lawrence R. Bollinger, Schenectady; Donald C. Crawford, Scotia, both of N.Y.

[73] Assignee: The United States of America as represented by the United States Department of Energy, Washington, D.C.

[21] Appl. No.: 539,370

[22] Filed: Oct. 6, 1983

[51] Int. Cl.⁴ .......................... G21C 7/12; G21C 7/18
[52] U.S. Cl. .................................... 376/235; 376/228
[58] Field of Search ............... 376/219, 223, 224, 226, 376/227, 228, 229, 230, 231, 232, 233, 235, 236, 237

[56] References Cited

U.S. PATENT DOCUMENTS

| | | |
|---|---|---|
| 3,158,766 | 11/1964 | Frisch . |
| 3,299,302 | 1/1967 | Frisch . |
| 3,480,807 | 11/1969 | Downs et al. . |
| 3,486,095 | 12/1969 | Sherwood et al. ................. 376/228 |
| 3,559,011 | 1/1971 | Edwards ............................ 376/230 |
| 3,607,629 | 9/1971 | Frisch et al. ........................ 376/228 |
| 3,825,160 | 7/1974 | Lichtenberger et al. ........... 376/228 |
| 3,882,333 | 5/1975 | DeWeese ............................ 376/228 |
| 3,902,963 | 9/1975 | Bertone et al. ..................... 376/228 |
| 3,946,258 | 3/1976 | Leshem .............................. 376/228 |
| 3,959,071 | 5/1976 | Bevilacqua ......................... 376/228 |
| 3,989,589 | 11/1976 | Frisch et al. ....................... 376/230 |
| 3,992,255 | 11/1976 | DeWeese ............................ 376/228 |

Primary Examiner—Charles T. Jordan
Assistant Examiner—Richard Klein
Attorney, Agent, or Firm—Judson R. Hightower; Richard E. Constant

[57] ABSTRACT

A multi-function magnetic jack control drive mechanism for controlling a nuclear reactor is provided. The mechanism includes an elongate pressure housing in which a plurality of closely spaced drive rods are located. Each drive rod is connected to a rod which is insertable in the reactor core. An electromechanical stationary latch device is provided which is actuatable to hold each drive rod stationary with respect to the pressure housing. An electromechanical movable latch device is also provided for each one of the drive rods. Each movable latch device is provided with a base and is actuatable to hold a respective drive rod stationary with respect to the base. An electromechanical lift device is further provided for each base which is actuatable for moving a respective base longitudinally along the pressure housing. In this manner, one or more drive rods can be moved in the pressure housing by sequentially and repetitively operating the electromechanical devices. Preferably, each latch device includes a pair of opposed latches which grip teeth located on the respective drive rod. Two, three, or four drive rods can be located symmetrically about the longitudinal axis of the pressure housing.

9 Claims, 8 Drawing Figures

MULTI-FUNCTION MAGNETIC JACK CONTROL DRIVE MECHANISM

FIELD OF THE INVENTION

The present invention relates generally to the movement of drive rods for the control rods in a reactor core, and more particularly to an apparatus for providing independent movement of a plurality of drive rods located in a single pressure housing.

BACKGROUND OF THE INVENTION

In order to control the energy produced by a reactor core, various control rods or the like are insertable into the reactor core. Typically, as shown in U.S. Pat. Nos. 3,604,746 (Notari) and 3,853,699 (Frisch et al), a plurality of control rods are joined to a single drive rod. The single drive rod extends through the reactor vessel head in a pressure housing and a control drive mechanism is utilized to raise or lower the drive rod and the associated control rods. Thus, as all of the associated control rods are operated simultaneously, the relatively large worth of a single control rod assembly causes severe perturbations in the axial flux during movement. Therefore, part length control rods were utilized to trim the axial power distribution and these part length control rods were joined in assemblies with a suitable drive rod and control drive mechanism. However, this approach increases the number of pressure housing which must be located on the reactor vessel head.

Other prior art of interest includes U.S. Pat. No. 3,989,589 (Frisch, deceased et al) which provides for locating a plurality of drive rods in a single pressure housing. Each drive rod is attached to an appropriate control rod assembly and is hydraulically actuated to move the associated assembly.

SUMMARY OF THE INVENTION

In accordance with the present invention, a multi-function magnetic jack control drive mechanism is provided for controlling a nuclear reactor. The control drive mechanism includes an elongate pressure housing which is attached to a reactor vessel head. Located in the pressure housing is a plurality of closely spaced drive rods which are connected to an appropriate rod or rod assembly insertable in the reactor core. An electromechanical stationary latch means is provided which is selectively actuatable to hold each of the drive rods stationary with respect to the pressure housing. An electromechanical movable latch means is also provided for each one of the plurality of drive rods. Each movable latch means includes a base and each latch means is selectively actuatable to hold a respective drive rod stationary with respect to the base. An electromechanical lift means is also provided for each base which is actuatable to move the base longitudinally with respect to the pressure housing. By sequentially and repetitively operating the various latch means and lift means, one or more of the drive rods can be moved longitudinally in the pressure housing independent of the other drive rods.

In the preferred embodiment, each drive rod has a series of teeth located along a portion thereof and the latch means include a pair of opposed latches for each respective drive rod which are located in the pressure housing and which are movable between a latched and unlatched position. Conveniently, a stationary latch means, a movable latch means, and a lift means is provided for each drive rod and these means are located adjacent one another in an assembly. Each assembly is then spaced along the longitudinal length of the pressure housing.

According to the preferred embodiment of the present invention, the plurality of drive rods are located symmetrically about the longitudinal axis of the pressure housing. Two, three, or four individual drive rods can be suitably located in a single pressure housing. In addition, each pair of latches is attached to a respective plunger which is mounted by guide bearings in the pressure housing for easy movement.

With the construction of a control drive mechanism according to the present invention, the functional equivalent of up to four separate control drive mechanisms can be fit within the approximate diameter of a single control drive mechanism which is mounted by a single attachment to the reactor vessel head. Alternatively, as many as four times the number of control drive rods and associated rod assemblies can be mounted in the space where a single prior art control drive mechanism was provided.

Where a control drive mechanism according to the present invention replaces up to four conventional control drive mechanisms, a greater space is provided between the control drive mechanisms. This allows better access to the reactor core during installation and servicing. In addition, where the control drive mechanisms are dismounted from the reactor head during refueling, the proposed design reduces the number of individual pressure housings and associated units which must be handled. The number of head penetrations which must be sealed and unsealed is also reduced.

Other features and advantages of the present invention are stated in or are apparent from the detailed description of presently preferred embodiments of the present invention found hereinbelow.

DETAILED DESCRIPTION OF THE PREFERRED EMBODIMENTS

With reference now to the drawings in which like numerals represent like elements throughout the several views, a portion of a control drive mechanism 10 is depicted in FIGS. 1, 2, 3 and 4. Control drive mechanism 10 includes a pressure housing 12 which is attached to the reactor vessel head. Located within pressure housing 12, in this embodiment, are three drive rods 14, 16, and 18. As shown best in FIGS. 2, 3 and 4, drive rods 14 16 and 18 are symmetrically located about the longitudinal axis of pressure housing 12. Each drive rod 14, 16 and 18 is connected at the lower end to a suitable rod which is insertable in the reactor core. It should be noted that the design of the present invention is particularly applicable to a thorium-water breeder reactor in which thorium shim rods are to be actuated separately from shutdown poison rods. This design is also particularly applicable with other reactors in which the number of control drive mechanisms that would otherwise be required exceeds the space available for them.

Figure 1:
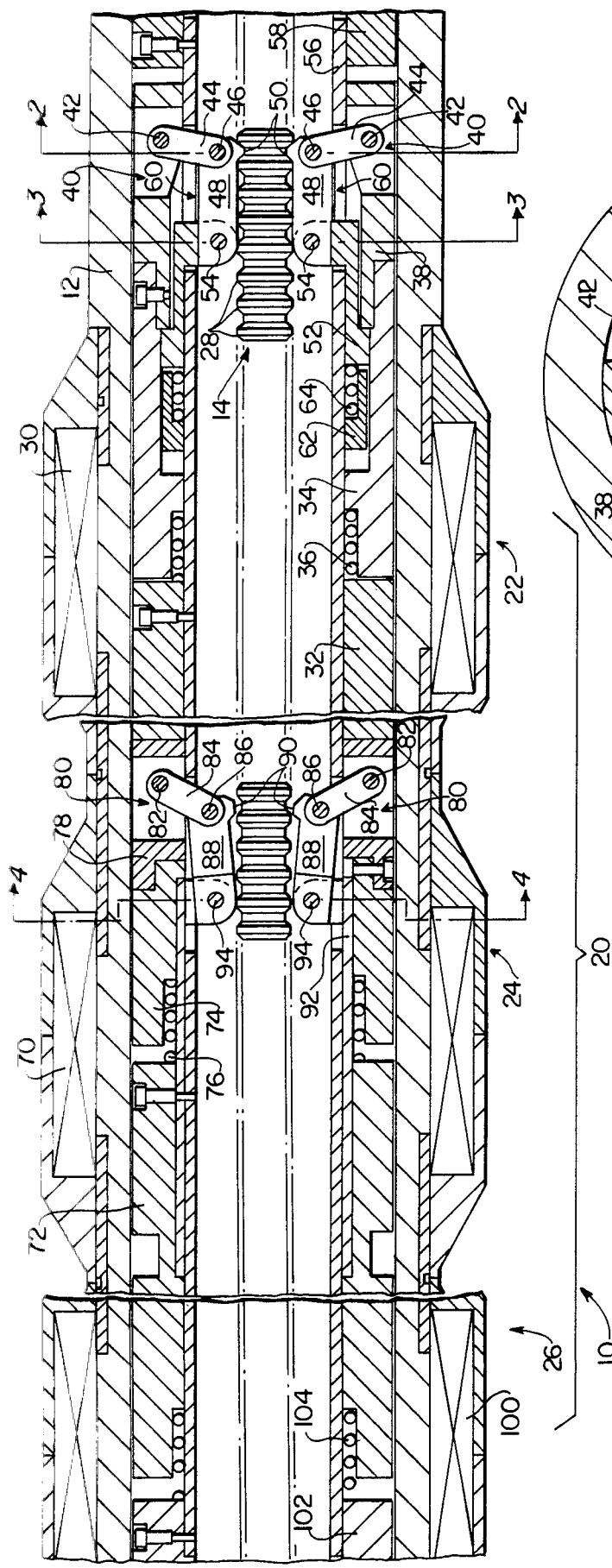
FIG. 1 is a cross-sectional elevation view of a portion of a control drive mechanism according to the present invention.

Depicted in FIG. 1 is a control drive assembly 20 for drive rod 14. Control drive assembly 20 includes a stationary latch means 22, a movable latch means 24, and a lift means 26. Drive rod 14 has a series of teeth 28 located along a portion of the longitudinal length thereof. It will be appreciated by those ordinarily skilled in this art that control drive assembly 20 is similar to conventional prior art control drive assemblies which have been used to move a single drive rod. However, control drive assembly 20 generally differs from conventional control drive assemblies in providing for movement of a drive rod (14) which is mounted eccentrically with respect to the axis of the pressure housing 12 and in providing an arrangement wherein the other drive rods (16 and 18) pass completely through control drive assembly 20 and are unaffected by actuation of control drive assembly 20.

As shown best in FIG. 1, stationary latch means 22 includes a coil 30 located around pressure housing 12. Adjacent coil 30, but inside of pressure housing 12, is a fixed electromagnet 32 and a movable electromagnet or plunger 34. Urging plunger 34 away from electromagnet 32 is a spring 36. Coil 30 is depicted in FIG. 1 in the energized state so that plunger 34 is urged toward electromagnet 32 and spring 36 is compressed.

Attached to the end of plunger 34 away from coil 30 is an annulus 38. As shown best in FIG. 2, annulus 38 includes two openings 40 in which two hinge pins 42 are mounted. Rotatably mounted to hinge pins 42 at one end are two link members 44. The other end of link members 44 are attached to respective hinge pins 46. Each hinge pin 46 is located in a latch 48. It should be noted that latches 48 oppose one another and include a tip 50 which is designed to fit in between teeth 28.

Each latch 48 is attached at the end opposite from hinge pin 46 to a second annulus 52 by hinge pins 54. Annulus 52 is mounted between plunger 34 and annulus 38 and a sleeve 56. Sleeve 56 is coaxially mounted to pressure housing 12 by spacer 58. Sleeve 56 includes an opening 60 through which second annulus 52 and link members 44 extend. Mounted to sleeve 56 is a stop 62. Located between stop 62 and second annulus 52 is a spring 64.

In operation, stationary latch means 22 is used to hold drive rod 14 stationary with respect to pressure housing 12. In FIG. 1, coil 30 is shown in the energized state so that plunger 34 is urged toward electromagnet 32 and tips 50 of latches 48 engage teeth 28. Upon de-energization of coil 30, spring 36 urges plunger 34 away from electromagnet 32. This causes hinge pins 42 to move away from electromagnet 32 so that link members 44 in turn cause tips 50 to be withdrawn from between teeth 28 as latch 48 rotates about hinge pins 54. Obviously, when coil 30 is energized again, tips 50 of opposed latches 48 again grip drive rod 14.

Movable latch means 24 is constructed similarly to stationary latch means 22. Thus, movable latch means 24 includes a coil 70, an electromagnet 72, a plunger 74, a spring 76 located between electromagnet 72 and plunger 74, and an annulus 78 attached at the opposite end of plunger 74 from electromagnet 72. Attached in openings 80 of annulus 78 are hinge pins 82 to which link members 84 are attached. At the other end, link members 84 are attached to hinge pins 86 which are mounted in latches 88 having tips 90. Latches 88 are attached to a second annulus 92 by hinge pins 94. Second annulus 92 is located between sleeve 56 and electromagnet 72 and plunger 74. Movable latch means 24 differs from stationary latch means 22 in that second annulus 92 is securely attached to electromagnet 72.

In operation, movable latch means 24 functions in much the same manner as stationary latch means 22. In FIG. 1, coil 70 of movable latch means 24 is de-energized. Thus, tips 90 of latches 88 are pivoted away from teeth 28 of drive rod 14. Upon energization of coil 70, plunger 74 is moved towards electromagnet 72 against the force of spring 76 causing annulus 78 to move as well. This causes link members 84 to move towards electromagnet 72 and force latches 88 to rotate about hinge pins 94 so that tips 90 are forced between teeth 28. When this occurs, drive rod 14 is held stationary with respect to electromagnet 72.

Lift means 26 includes a coil 100 which is located about pressure housing 12 opposite an electromagnetic spacer 102 located inside of pressure housing 12. Mounted between spacer 102 and electromagnet 72 is a spring 104. It should be noted that electromagnet 72 is slidably mounted between pressure housing 12 and sleeve 56 and that one end of electromagnet 72 acts as a pole for coil 70 while the other end acts as a pole for coil 100. Thus, when coil 100 is energized, electromagnet 72 moves toward electromagnetic spacer 102 against the force of spring 104. As electromagnet 72 moves, it should be noted that second annulus 92 moves as well. In FIG. 1, coil 100 is shown de-energized.

In operation, control drive assembly 20 functions in the following manner to raise drive rod 14. Initially, coil 30 is energized and coils 70 and 100 are de-energized as shown in FIG. 1. In this condition, stationary latch means 22 holds drive rod 14 stationary with respect to pressure housing 12 and hence the reactor core. When it is desired to raise drive rod 14, coil 70 is energized causing latches 88 to engage drive rod 14. After this is accomplished, coil 30 is de-energized so that latches 48 disengage from drive rod 14. Coil 100 is then energized causing electromagnet 72 and second annulus 92 to move upward toward electromagnetic spacer 102. This in turn causes latches 88 to move upward pulling drive rod 14 along with them. After electromagnet 72 has completed its movement, coil 30 is again energized so that latches 48 grip drive rod 14 and hold it stationary. Coil 70 is then de-energized which results in plunger 74 moving away from electromagnet 72 so that latches 88 no longer grip drive rod 14. Coil 100 is then de-energized so that electromagnet 72 and plunger 74 return to the position depicted in FIG. 1. By repetitively following this series of steps, drive rod 14 can be sequentially moved upward as desired.

In order to move drive rod 14 downward, a similar procedure is followed. However, coil 100 is energized initially so that upon energization of coil 70, latches 88 are already in the raised position. Thus, de-energization of coil 100 allows drive rod 14 to move downward while gripped by latches 88. Latches 48 function in the same manner to hold drive rod 14 when drive rod 14 is not gripped by latches 88. Again, a repetitive sequence is followed to sequentially move drive rod 14.

Figure 2:
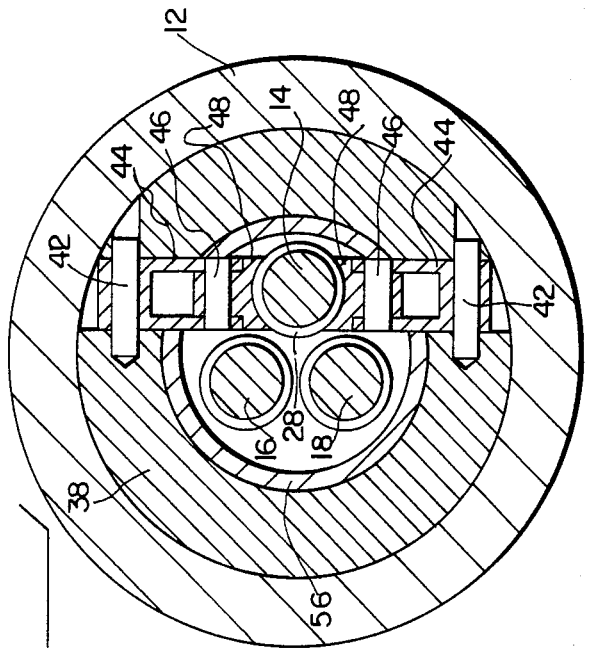
FIG. 2 is a cross-sectional view of the control drive mechanism depicted in FIG. 1 taken along the line 2—2.
Figure 4:
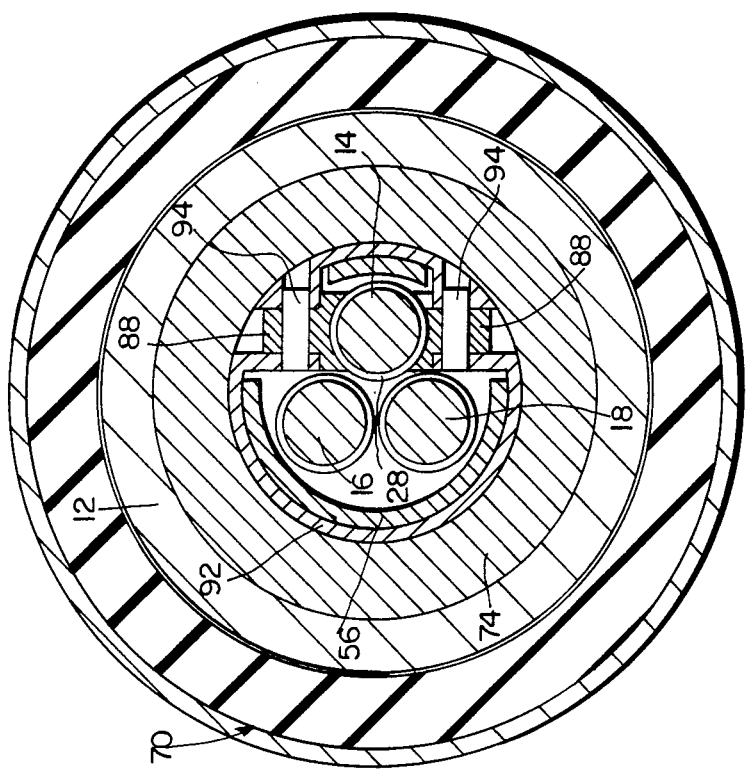
FIG. 4 is a cross-sectional view of the control drive mechanism depicted in FIG. 1 taken along the line 4—4.
Figure 3:
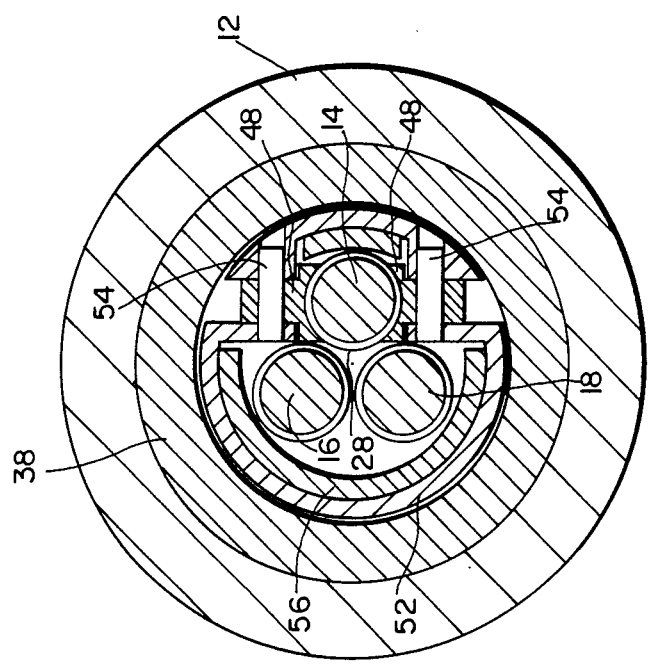
FIG. 3 is a cross-sectional view of the control drive mechanism depicted in FIG. 1 taken along the line 3—3.
Figure 7:
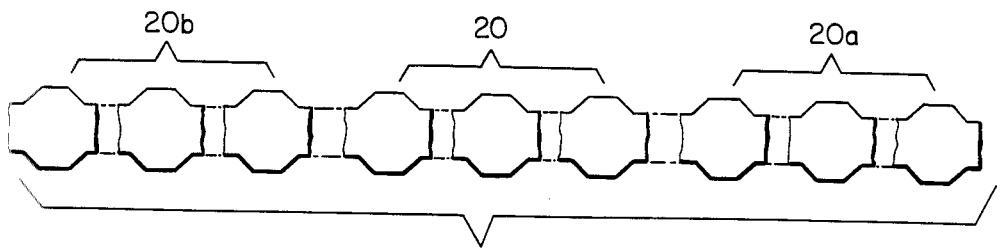
FIG. 7 is an elevation view of the control drive mechanism a portion of which is depicted in FIG. 1.
Figure 8:
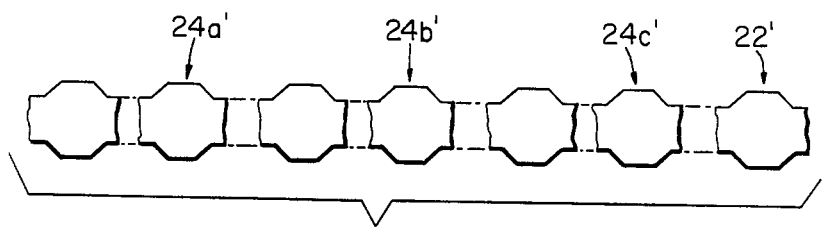
FIG. 8 is an elevation view of a modified control drive mechanism according to the present invention.

As shown best in FIGS. 2 to 4, drive rods 16 and 18 are closely spaced to drive rod 14. However, during movement of drive rod 14, drive rods 16 and 18 are not affected or moved. In order to affect movement of drive rods 16 and 18, a respective control drive assembly 20a and 20b for each drive rod 16 and 18 is positioned in the same manner with respect to pressure housing 12 above or below control drive assembly 20 as shown in FIG. 7. It should be noted that with this construction, each drive rod 14, 16 and 18 can be individually moved or held stationary while the other two drive rods are moved or held stationary. In order to determine the positions of drive rods 14, 16 and 18, a permanent magnet is embedded in the top of drive rods 14, 16 and 18 at a position above the uppermost control drive assembly. Three separate external reed switch units, one adjacent to each drive rod, are then used as part of a position indicator system to sense the position of each drive rod.

In conventional commercial control drive mechanisms, three latches are provided with each latch mean to symmetrically load the drive rod. With this invention, only two latches are used. However, it should be noted that the two latches also provide symmetrical loading of the drive rod. However, with the present invention, the drive rods are eccentric from the longitudinal axis of pressure housing 12. Thus, the plungers and annuli are not symmetrically mounted with respect to the drive rod on which they act. In order to minimize this asymmetric loading, the magnetic components can be appropriately designed. Alternately, rollers similar to commercial cam rollers could be added to the plunger and annuli to provide rolling contact with pressure housing 12 and sleeve 56.

Figure 5:
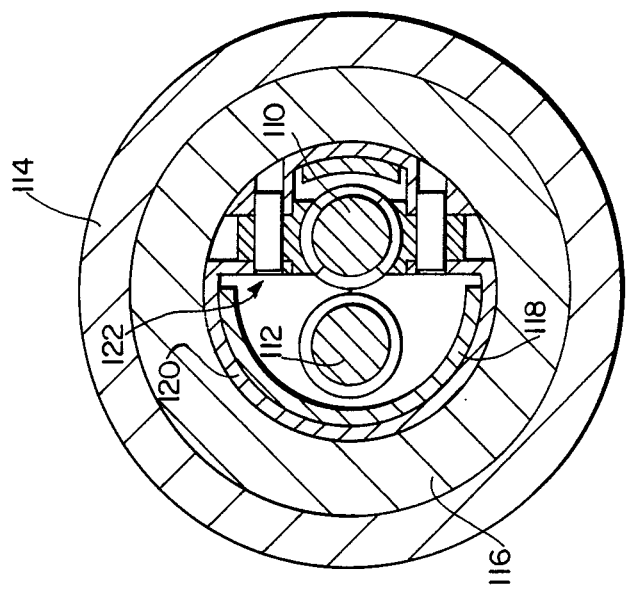
FIG. 5 is a cross-sectional view of an alternate embodiment of a control drive mechanism according to the present invention.

Depicted in FIG. 5 is an alternative embodiment of the present invention where two drive rods 110 and 112 are located in a pressure housing 114. As with the embodiment described above, an annulus 116 is located between pressure housing 114 and a sleeve 118. The location of a suitable second annulus 120 and gripper mechanism 122 for drive rod 110 as shown. With this embodiment, two separate drive rods can be actuated in pressure housing 114.

Figure 6:
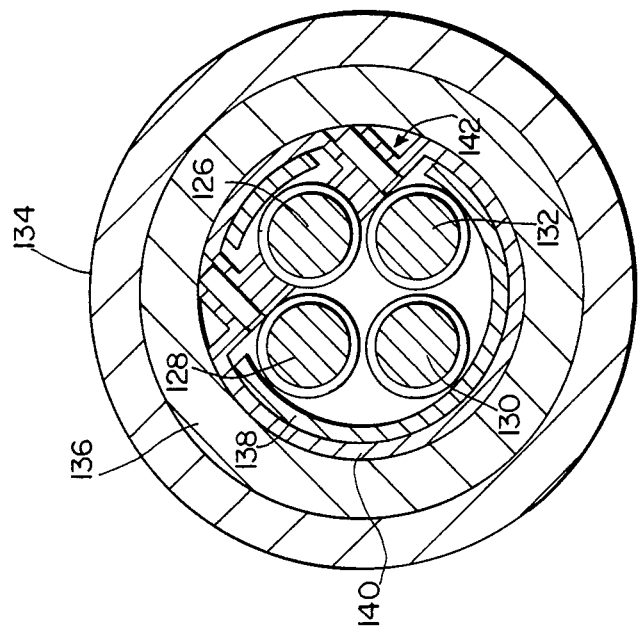
FIG. 6 is a cross-sectional view of still another alternate embodiment of a control drive mechanism according to the present invention.

Still another embodiment of the present invention is depicted in FIG. 6. In this embodiment, four drive rods 126, 128, 130 and 132 are located in a suitable pressure housing 134. Inside of pressure housing 134 is an annulus 136, a sleeve 138, and a second annulus 140. The location of a gripper mechanism 142 for drive rod 126 is also shown. With this embodiment, four separate drive rods are located in pressure housing 134 and are independently actuatable.

Although the present invention has been described with respect to a simple cylindrical pressure housing with each drive rod eccentric to the longitudinal axis of the pressure housing, an offset pressure housing could be used to permit the pressure housing to be concentric with each drive rod at the height of the control drive assembly which drives that particular drive rod. This would result in symmetric loading of the plungers. However, the offset pressure housing would complicate coil assembly installation, requiring either that the lower coil assembly be installed before the upper portion of the pressure housing, or that the pressure housing be extended to include a reduced-diameter portion between the upper and lower coil assemblies.

In the preferred embodiment, each control drive assembly has been described as containing a stationary latch means. However, it would be possible to provide a common stationary latch means 22' for all of the drive rods. Then, during movement of one or more of the drive rods, the drive rods not being driven would be held in place by the respective movable latch means 24a', 24b', and 24c' which would not be lifted.

Thus, while the present invention has been described with respect to exemplary embodiments thereof, it will be understood by those of ordinary skill in the art that these and other variations and modifications can be effected within the scope and spirit of the invention.

We claim:

1. A multi-function magnetic jack control drive mechanism for controlling a nuclear reactor comprising:
    an elongate pressure housing;
    a plurality of closely-spaced drive rods located in said pressure housing, each said drive rod being connected to a reactor rod which is insertable in a reactor core;
    a plurality of electromechanical stationary latch means which are selectively actuatable for holding a respective one of said drive rods stationary with respect to said pressure housing, said plurality of stationary latch means including at least one coil located about said pressure housing;
    a plurality of longitudinally spaced electromechanical movable latch means, individually associated with one of said drive rods and each including a base for the drive rod associated therewith, for, when actuated, holding the associated drive rod stationary with respect to the base associated therewith, each said movable latch means including an associated coil located about said pressure housing; and
    a plurality of longitudinally spaced electromechanical lift means, individually associated with each said base, for, when actuated, moving an associated base longitudinally along said pressure housing from a first position to a second position to thereby enable movement of one or more of said other drive rods longitudinally independently of said other drive rods in response to sequential and repeated operation of said electromechanical means, each said lift means including an associated coil located about said pressure housing.

2. A control drive mechanism as claimed in claim 1 wherein each said drive rod has a series of teeth located along a portion of the longitudinal length thereof and said stationary latch means and said movable latch means include a pair of directly opposed latches for each respective drive rod which are located in said pressure housing and which are movable between a latched and unlatched position with respect to the teeth of a respective drive rod.

3. A control drive mechanism as claimed in claim 2 wherein each said electromechanical stationary latch means is longitudinally spaced along said pressure housing and includes an associated coil for each said drive rod located adjacent the outside of said pressure housing and operatively associated only with a respective pair of latches such that each said drive rod is selectively held stationary independent of the other said drive rods.

4. A control drive mechanism as claimed in claim 2 wherein said plurality of electromechanical stationary latch means include a single coil located adjacent the outside of said pressure housing and operatively associated with the plurality of stationary pairs of latches such that all of said drive rods are held stationary at the same time.

5. A control drive mechanism as claimed in claim 3 wherein said stationary latch means, said movable latch means, and said lift means for a respective said drive rod are located adjacent one another in an assembly, and said assemblies are spaced along the longitudinal length of said pressure housing.

6. A control drive mechanism as claimed in claim 2 wherein said plurality of drive rods are located symmetrically about the longitudinal axis of said pressure housing and said pairs of latches are attached to a respective plunger which is mounted by guide bearings in said pressure housing.

7. A control drive mechanism as claimed in claim 1 wherein there are two of said drive rods located symmetrically about the longitudinal axis of said pressure housing.

8. A control drive mechanism as claimed in claim 1 wherein there are three of said drive rods located symmetrically about the longitudinal axis of said pressure housing.

9. A control drive mechanism as claimed in claim 1 wherein there are four of said drive rods located symmetrically about the longitudinal axis of said pressure housing.

* * * * *